Jan. 1, 1963  R. HADEKEL  3,071,714
ELECTROMAGNETIC ACTUATORS
Filed Jan. 22, 1960  2 Sheets-Sheet 1

INVENTOR.
REUBEN HADEKEL
BY
ATTORNEY

INVENTOR.
REUBEN HADEKEL
BY
ATTORNEY

United States Patent Office 3,071,714
Patented Jan. 1, 1963

3,071,714
ELECTROMAGNETIC ACTUATORS
Reuben Hadekel, London, England, assignor to The Sperry Gyroscope Company Limited, Brentford, Middlesex, England, a company of Great Britain
Filed Jan. 22, 1960, Ser. No. 4,041
Claims priority, application Great Britain Jan. 30, 1959
4 Claims. (Cl. 317—172)

This invention relates to an electromagnetic actuator of the kind having magnetic material shaped to provide a path for flux topologically similar to a figure eight whereby two main flux circuits are provided both passing through the cross piece of the eight and one or other of its ends, and one auxiliary flux circuit which by-passes the cross piece, at least one pair of air gaps between provided in the separate portions of the paths of the main flux circuits, these gaps being mechanically interdependent whereby a lengthening of either air gap is accompanied by a corresponding shortening in the other, and means being provided for establishing flux differentially in the main flux circuits in a manner whereby the two flux circuits are unidirectionally polarized with relation to a common saturable armature and the force between and/or the relative positions of the portions of magnetic material separted by the air gaps can be varied differentially varying the flux established in the respective paths of the main flux circuits.

According to the invention, an electromagnetic actuator of the kind specified is constructed and arranged to be operated so that constant magnetic saturation exists in an armature providing a common flux path for the two main flux circuits while saturation never occurs in the individual stator core parts of the paths for the two main flux circuits and hence in the path of the auxiliary flux circuit. By limiting the total flux carried by the individual cores at the armature, the sum of the fluxes at the two air gaps remains constant at all times. As a result, the force or torque exerted on a movable portion of the magnetic material constituting an armature is easily made substantially linearly proportional over a large range to an input signal differentially varying the flux established in the respective main flux paths.

A similar condition holds for changes in the flux circuits brought about by forcible displacement of the armature. If the armature is displaced to shorten one air gap and lengthen the other, the reluctance of the first flux circuit decreases and that of the second flux circuit increases. In consequence, the flux across the first air gap is increased while that across the second gap is decreased, the increase and decrease being of equal amounts. Thus the displacement of the armature results in the superimposition on the original flux distribution of additional flux in the auxiliary flux circuit crossing the air gaps, just as through an input signal had been applied.

The result thus obtained differs markedly from that obtained with electromagnetic actuators of the kind specified as used in the prior art. In these, if the armature is displaced to shorten one air gap by an appreciable fraction of the original length, the reluctance of one main circuit increases very considerably (since it is dependent very largely on the reciprocal of the length of the air gaps) whereas that of the other main circuit decreases relatively slightly. In consequence, the flux across the shortened air gap increases to a considerably higher magnitude than that obtaining in the zero condition, while that across the lengthened air gap decreases only to a much smaller extent. Therefore the magnetic forces acting at the shorter gap change much more rapidly than the magnetic forces acting at the longer gap. Consequently the unbalance force or torque acting on the armature rises at a faster and faster rate as one or other of the air gaps becomes very short. It follows that the force-versus-displacement characteristic of the system is very markedly non-linear. In the actuator of the invention, the last-mentioned effect does not arise, so that the unbalance force acting on the armature can be made much more nearly a linear function of the displacement.

The fact that in the actuator of the invention the force or torque acting on the armature, developed as a result of a displacement of the armature, increases nearly linearly with displacement is particularly important because this force or torque is in the direction to increase the displacement. This may be expressed by the statement that the magnetising forces acting on the armature are equivalent to a centralising spring of negative stiffness. It follows that actuators of the kind to which the invention relates are inherently positionally unstable.

This negative stiffness or instability constitutes a considerable objection against the use of known actuators of this kind in servo systems, e.g. for use in displacing a hydraulic control valve. Even more seriously disadvantageous is the fact, which follows readily from what has been established above, that in the known actuators the negative stiffness is non-linear, increasing with increasing displacement of the armature from its central or zero position; this greatly increases the instability.

The actuator of the invention is free from the disadvantage that the negative stiffness increases rapidly with displacement. Although it has the instability that results from the mere fact that the stiffness is negative, this disadvantage can readily be overcome and turned to an advantage, by fitting the armature with a centralising spring having a stiffness slightly greater than the inherent negative stiffness that measures the unstabilising effect of the magnetic forces on the armature. The transducer, when fitted with such a spring, will then be stable in operation and sensitive, since the effective stiffness is very low. There is, of course, no need to fit centralising springs if the transducer is used to displace a load that suitably resists displacement from a zero position, because the load itself then simulates a centralising spring. An electromagnetic actuator according to the invention therefore actuates a load of this kind with complete stability provided that the effective stiffness of the load is slightly greater than the negative stiffness of the actuator.

By way of contrast, if a centralising spring were used on an electromagnetically polarised actuator according to the prior art, a choice could be made of two possible values for the stiffness of the centralising spring, each of which would have its own disadvantages:

(i) The spring could be made very stiff, in which case the actuator would be stable in operation but would be very insensitive in its movement response to small input signals:

(ii) The spring could be of low stiffness, slightly greater than the negative stiffness of the actuator for small displacements, so that the displacement produced by the transducer would be apreciable for small signal inputs, but the actuator would then be unstable if, for any reason, a displacement were produced whose magnitude were a considerable fraction of the air gap.

Preferably the magnetic material is divided into three parts; a central armature having four poles and including the part of the flux path which is unidirectionally saturated, and a pair of core members each having two poles providing respective gaps, while the armature is preferably so movable that one of the gaps between it and one of the core members are shortened as the other of the gaps between it and the other of the core members are correspondingly lengthened.

The armature may be of four-cornered form with the poles at the corners, and the air gaps may be lengthened and shortened by a sliding motion of the armature towards one core member and away from the other. Again, the armature may be arranged to rotate about an axis to change the dimensions of the air gaps.

In another arrangement the core members may be of pot-magnet form, that is to say, approximately of the form generated by rotating an E-shape about its axis of symmetry so as to provide a central pole co-axially surrounded by an annular pole. An armature interposed between a pair of such core members may have the form of a disc and is arranged to approach one core member as a whole while it receeds from the other.

Separate means may be employed for polarising the armature to saturation in the common path of the main flux circuits and for differentially varying the flux in the main circuits (or establishing flux or one or other polarity in the subsidiary circuit) to vary the position of or the force or torque exerted upon the armature. The polarising means may consist of a winding or windings, or one or more permanent magnets, or may include a winding and a permanent magnet. Again, polarising currents may be algebraically added to differential currents so that common windings can be used for both currents.

In order that the invention may be clearly understood and readily carried into practice, several embodiments will now be described by way of example with reference to the accompanying drawings, in which.

Figure 1:
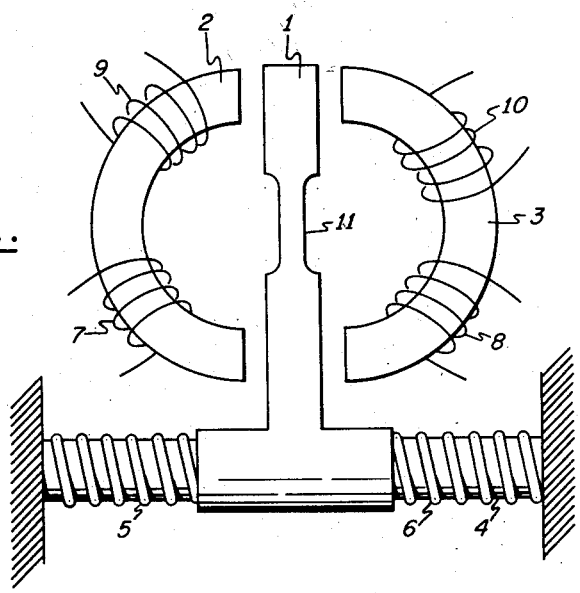
FIG. 1 shows a simple form of actuator in which the stator is provided by a pair of U-shaped core members.

Referring now to FIG. 1 the actuator there shown is of such a construction that the figure eight form of the flux path is readily apparent. A bar-shaped saturable magnetic armature 1 is interposed between two symmetrically arranged U-shaped core members 2 and 3 of equal characteristics that provide the stator. The armature 1 is mounted to slide but not to turn on a square shaft 4. Centralising springs 5 and 6 tend to urge the armature into a position of symmetry in relation to the two core members.

The core members 2 and 3 carry equal windings 7 and 8 for producing polarising flux along their length, returning, in the same direction for both members, along the bar armature 1, and they also carry signal input windings 9 and 10, which may be connected in series and which, when energised, provide ampere turns that add to the polarising ampere-turns on one or other of the core members and subtract from the polarising ampere-turns on the remaining core member. The central portion of the bar armature is reduced in cross sectional area at 11, so that it will saturate at values of magnetising current which will still leave the core members and the end portions of the armature able to carry without approach to saturation considerable additional flux. The polarising currents are such as to ensure that the armature is saturated at the flux saturation level of its area of reduced cross sectional area. Accordingly, the fluid saturation level of the identical core members 2 and 3 is above that of the armature 1. The two magnetic core members 2 and 3, as well as the armature 1, are also unidirectionally polarized at the flux saturation level of the armature.

It will be observed that the flux path is in the form of a figure eight, the central part 11 of the armature constituting the cross piece of the eight, and the cores the end loops of the eight. Each core member, together with the greater part of the armature including the central part 11 provides a main flux circuit, while a subsidiary flux circuit is constituted by both core elements together with the pole portions only of the armature.

Owing to the constant saturation of the section of reduced cross sectional area 11 between the polar terminals of the armature, the sum of the fluxes at the four gaps remains constant. The armature 1 of the improved actuator provides a common flux path for the flux of the respective cores 1 and 2 that limits the total flux carried by the two cores to its saturation level. The effect of a change in the signal current is therefore to decrease the flux between the spaced poles of one core members and the armature, and to increase the flux between the spaced poles of the other core members and the armature by an amount equal to the decrease. The armature of the actuator provides a saturable common flux path for the flux of the respective magnetic cores.

The effect of a displacement of the armature is similarly to increase and decrease the flux in the respective gaps between the magnetic cores and the armature by equal amounts. It follows that the force-versus-displacement characteristic of the core and armature system is substantially linear. The springs 5 and 6 also, of course, have a substantially linear force-versus-displacement characteristic. It can be seen, then, that by a suitable choice of springs the actuator can be made both sensitive and stable. As a possible modification of this embodiment, each core member may carry only one winding, and the windings would then be energised by currents which are the algebraic sum of the required polarising and signal currents.

Figure 2:
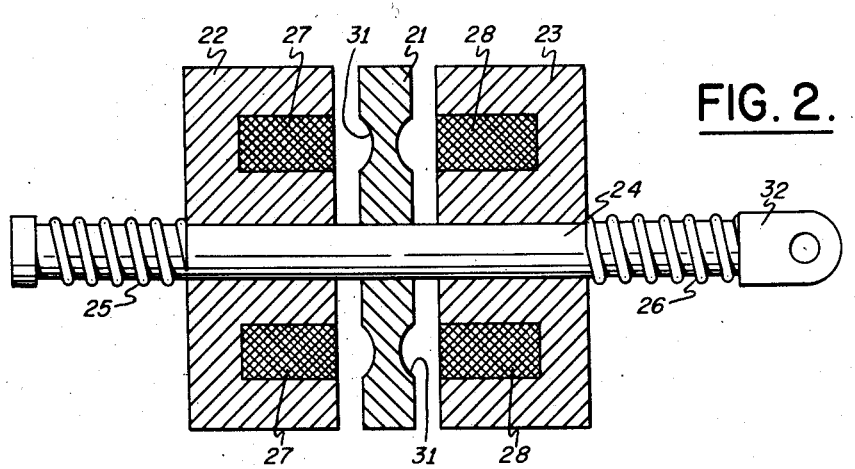
FIG. 2 shows in section another form of actuator in which the stator is provided by core members in the form of pot magnets.

The embodiment shown in FIG. 2 is virtually derived from the embodiment of FIG. 1 by taking a section of the FIG. 1 embodiment in the plane of the drawing and rotating the section about the axis of the bar 4 to form solids of revolution. As a result, we have a generally disc shaped armature 21 interposed between a pair of cores 22 and 23 of pot magnet form. In this form of the invention, the stator is provided by two cores of E-shaped axial cross section with the poles at the open ends thereof arranged in spaced facing relation. The armature is provided with an annular zone 31 of reduced cross sectional area and is secured to a rod 24 which slides in the core members and is provided with centralising springs 25 and 26 to centralise the armature in relation to the cores.

Windings are carried in the annular cavities provided by the respective cores at 27 and 28. These windings may consist of separate polarising and signal windings or of windings which carry algebraically added polarising and signal currents. Again, the cores may include permanently magnetised portions, which could be, for example, the portions surrounding the rod 24, and the windings in the cavities of the core could consist of signal windings only. The rod 24 is provided at 32 with means for connecting it to a device operated by the actuator, such as a valve controlling the position of a hydraulically operated jack.

It will be observed that the flux path provided by the actuator of FIG. 2 is of the form swept out by a figure-eight rotating about an axis lying to one side, and it thus has a topological similarity to the flux path of the FIG. 1 embodiment. As in that embodiment, the part of the armature of reduced cross sectional area, that is to say, the zone 11, is kept constantly saturated (by polarising currents or by the magnetic force of permanent magnets incorporated in the cores). The signal currents, as in the first embodiment, have the effect of reducing the flux across the air gaps between the armature and the two spaced poles of one core, while increasing the flux across the air gaps between the armature and the two spaced poles of the other core by just the same amount. Similarly a displacement of the armature will cause equal and opposite changes in the amount of flux across the air gaps on the respective sides of the armature. Thus, by choosing centralising springs of suitable stiffness the actuator of FIG. 2 can be made both stable and sensitive. Should the actuator be used to actuate a load which includes resilient centralising means of suitable stiffness it is of course possible to dispense with the centralising springs 25 and 26.

Figure 3:
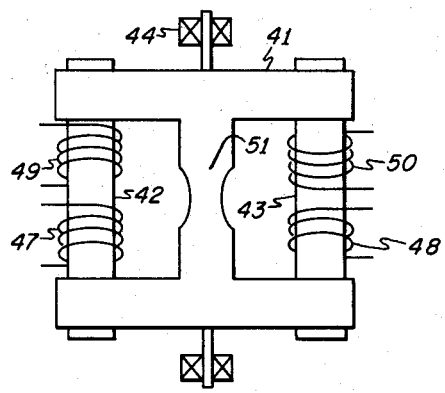
FIG. 3 shows yet another form of actuator in which the stator is provided by core members in the form of straight bars and an H-shaped pivoted armature.
Figure 4:
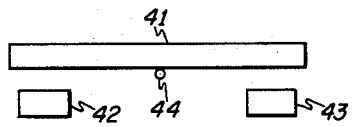
FIG. 4 is an end view of the actuator shown in FIG. 3.

Referring now to FIGS. 3 and 4, the actuator shown there is similar in principle to that shown in FIG. 1, and provides a path for flux in the form of a figure eight. But it has an armature 41 arranged not to slide but to rotate, and the armature and core members 42 and 43 are differently shaped from those of the FIG. 1 embodiment. Thus the armature is generally H-shaped in form and is mounted on a rod 44 which is mounted in bearings to rotate about its own axis. The symmetrical core members 42 and 43 of the stator are formed as straight bars arranged in parallel relation having polarising windings 47 and 48 and signal input windings 49 and 50 as in the FIG. 1 embodiment. The poles of the stator are at the respective ends of the spaced bars. The pivot rod 44 is connected in any suitable manner to the device to be operated—thus if the device has a member which requires to be rotated, the member may be mounted on the pivot rod, or if a member has to be moved rectilinearly, it may be connected by a link to a crank carried by the rod. Centralising springs or the equivalent (not shown) may be arranged in any suitable manner on the actuator or on the device operated to urge the armature towards a neutral position in which the air gaps between the armature and one core are equal to the air gaps between the armature and the other core.

Since rotation of the armature about the pivot rod axis increases the air gaps between the armature and the spaced poles of one core while correspondingly decreasing the air gaps between the armature and the spaced poles of the other core, the motion of the armature has the same effect on the magnetic circuits as in FIG. 1 embodiment. The armature is provided with a portion 51 of reduced cross sectional area and the polarising windings carry sufficiently high currents to ensure that the portion 51 of the armature is saturated whenever the actuator is in operation. As a result, the sum of the fluxes across the air gaps between the armature and the cores remains the same, so that the force-versus-displacement characteristic of the core and armature system is substantially linear and sensitivity without instability is easily obtained. As in the other embodiments, combined polarising and input signal windings may be substituted for the separate windings described, or the cores may include permanently magnetised portions to polarise the actuator.

Figure 5:
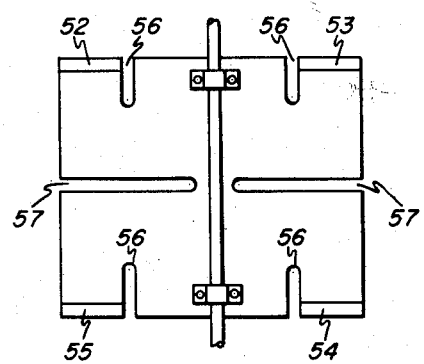
FIG. 5 shows a modified armature for the actuator shown in FIGS. 3 and 4.

FIG. 5 shows an alternative construction for the armature 41 shown of the actuator shown in FIG. 4. This alternative armature is viewed from the opposite side to that shown in FIG. 4. It is constructed of sheet metal and has four poles, 52, 53, 54 and 55 formed by bending portions of the sheet up through a rightangle in a manner which will be clear from the drawing. Shallow slots 56 are cut into the ends between pairs of poles cooperating with respective core members, while deeper slots 57 are cut into the sides between pairs of poles cooperating with a common core member. The slots 57 ensure that the armature shall readily saturate in respect of flux passing lengthwise along it while the core members themselves and the paths across the ends of the armature from one core member to the other are still free from saturation.

What is claimed is:

1. An electromagnetic actuator comprising a stator and a saturable magnetic armature mounted to move in relation to the stator with respect to an axis; said stator including a first magnetic core with a saturation level above that of the armature having a first pair of spaced poles providing a gap arranged symmetrically with respect to the axis, a second magnetic core with the saturation level and characteristics of the first core having a second pair of spaced poles providing a gap corresponding to the gap of the first core arranged in corresponding symmetry with relation to the axis; said armature including respective pairs of polar terminals arranged in relation to its axis and to the stator to vary the gap between the first pair of stator poles and the gap between the second pair of stator poles differentially and provide a common flux path for the flux of the respective cores that limits the total flux carried by the two cores to its saturation level, means for unidirectionally polarizing the armature and the two magnetic cores at the flux saturation level of the armature, and means for varying the polarization of the respective cores of the stator differentially to move the flux saturated armature toward one of the pairs of stator poles and away from the other of the pairs of stator poles.

2. An actuator of the character claimed in claim 1, in which the respective cores of the stator are U-shaped with the poles at the open ends thereof arranged in spaced facing relation normal to the axis of the armature, and the armature is a bar that is slideably mounted to move along the axis between the polar ends of the spaced cores.

3. An actuator of the character claimed in claim 1, in which the respective cores of the stator are of E-shaped axial cross section with poles at the open ends thereof arranged in spaced facing relation, and the armature is a disc that is slideably mounted to move along the axis between the polar ends of the spaced cores.

4. An actuator of the character claimed in claim 1, in which the stator is provided by two straight cores arranged in spaced parallel relation to the axis with poles at the respective ends thereof, and the armature is an H-shaped member with poles at the respective corners thereof that is mounted to move about the axis.

References Cited in the file of this patent

UNITED STATES PATENTS

| 1,230,429 | Palmer et al. | June 19, 1917 |
| 1,541,618 | Brown | June 29, 1925 |
| 2,295,390 | Dickten | Sept. 8, 1942 |
| 2,859,391 | Ericson | Nov. 4, 1958 |
| 2,894,181 | Brewer | July 7, 1959 |